(12) United States Patent
Pulleyblank et al.

(10) Patent No.: US 10,875,463 B2
(45) Date of Patent: Dec. 29, 2020

(54) TAILGATE STORAGE COMPARTMENT

(71) Applicant: GM Global Technology Operations LLC, Detroit, MI (US)

(72) Inventors: Mark Pulleyblank, Harrison Township, MI (US); Dusan Colovic, Troy, MI (US); James M. Townson, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 186 days.

(21) Appl. No.: 16/225,398

(22) Filed: Dec. 19, 2018

(65) Prior Publication Data

US 2020/0198544 A1    Jun. 25, 2020

(51) Int. Cl.
*B60R 9/06* (2006.01)
*B62D 33/027* (2006.01)
*B60R 5/04* (2006.01)

(52) U.S. Cl.
CPC .............. *B60R 9/065* (2013.01); *B60R 5/04* (2013.01); *B62D 33/0273* (2013.01)

(58) Field of Classification Search
CPC  B60R 9/06; B60R 9/065; B60R 11/06; B60R 5/04; B62D 33/0273; B62D 33/03; B62D 33/027
USPC ................................................ 296/57.1, 37.6
See application file for complete search history.

(56) References Cited

U.S. PATENT DOCUMENTS

| | | |
|---|---|---|
| 5,518,158 A | 5/1996 | Matlack |
| 6,199,930 B1 | 3/2001 | Riley |
| 6,502,885 B1 | 1/2003 | Gammon et al. |
| 6,811,067 B2 | 11/2004 | Muizelaar et al. |
| 7,111,884 B2 | 9/2006 | Johnson |
| 7,566,085 B2* | 7/2009 | Jaskolski ........... B62D 33/0273 296/37.6 |
| 7,628,439 B1 | 12/2009 | Strong |
| 7,631,919 B2* | 12/2009 | Schrader ............ B62D 33/0273 296/37.14 |
| 9,308,947 B2 | 4/2016 | Kmita et al. |
| 9,598,024 B2 | 3/2017 | Kogut |
| 9,944,333 B1 | 4/2018 | Stojkovic et al. |
| 2007/0090662 A1 | 4/2007 | Katterloher et al. |
| 2007/0261181 A1 | 11/2007 | Willard et al. |
| 2010/0140973 A1 | 6/2010 | Duncan |
| 2011/0072596 A1 | 3/2011 | Kenny |

(Continued)

FOREIGN PATENT DOCUMENTS

CN            207389332 U    5/2018

*Primary Examiner* — Stephen T Gordon

(57) ABSTRACT

A tailgate includes a first panel, a second panel connected to the first panel at a first side and a second side opposite to the first side as well as a cavity defined by the first panel and the second panel. An opening defined by the first panel between the first side and the second side, provides access to the cavity. A storage compartment is positioned in the cavity. A latching mechanism, located within the cavity and outside of the storage compartment, includes a latch, a first latch actuator, and an actuator rod connecting the latch and the latch actuator, which is affixed to the first side of the tailgate. A compartment door, connected to the tailgate and movable between a first and second position, covers the storage compartment in a first position. The compartment door includes a striker, which is engage-able by the latch.

20 Claims, 11 Drawing Sheets

(56) References Cited

U.S. PATENT DOCUMENTS

2012/0325877 A1\* 12/2012 Franks ................... B60R 11/06
2017/0274745 A1    9/2017 Lewis et al.

\* cited by examiner

TAILGATE STORAGE COMPARTMENT

INTRODUCTION

The present disclosure relates to a tailgate storage compartment.

In-cab storage provides a place to store items securely within pick-ups trucks; such spaces may include center consoles, glove compartments, and under-seat storage. However, pick-up trucks may lack conveniently accessible, secure storage outside of the cab for items such as tools, gloves, or vehicle accessories. To provide secure storage space, bed mounted tool boxes may be utilized. In addition, various tailgate storage solutions have also been introduced.

Yet, storage solutions that take up volume in the pick-up box bed may interfere with storing other items in the pick-up box bed. In addition, storage solutions may utilize locks or latches that are located in places where they are easily seen. When not concealed, locks or latches may lack a desirable level of security. Further, if latching mechanisms are located within the storage compartment itself, the latching mechanisms may become jammed by items within the storage compartment.

Thus, while current storage compartments may achieve their intended purpose, there is a need for a new and improved system and method for providing exterior storage compartments.

SUMMARY

According to several aspects, a tailgate includes a first panel and a second panel connected to the first panel at a first side and a second side opposite to the first side. The tailgate also includes a cavity defined by the first panel and the second panel. The tailgate further includes an opening defined by the first panel, between the first side of the tailgate and the second side of the tailgate, the opening providing access to the cavity. The tailgate yet further includes a storage compartment, wherein the storage compartment is positioned in the cavity. In addition, the tailgate includes a latching mechanism located within the cavity and outside of the storage compartment. The latching mechanism includes a latch, an actuator rod, and a first latch actuator, wherein the actuator rod connects the latch and the latch actuator and the first latch actuator is affixed to the first side of the tailgate. In addition, the tailgate further includes a compartment door connected to the tailgate and movable between a first position and a second position, wherein when in the first position, the storage compartment is covered by the compartment door. The compartment door includes a striker, wherein the striker is engage-able by the latch.

In an additional aspect of the present disclosure, the tailgate storage compartment includes a pocket defined by the storage compartment, wherein the latch is at least partially located in the pocket.

In an additional aspect of the present disclosure, the first side and the second side of the tailgate are formed from the first panel.

In an additional aspect of the present disclosure, the tailgate further includes a latch mounting bracket, wherein the latch mounting bracket is affixed to the first panel.

In an additional aspect of the present disclosure, the latch is affixed to the latch mounting bracket.

In an additional aspect of the present disclosure, the first latch actuator includes a pull lever latch actuator or a push-button actuator.

In an additional aspect of the present disclosure, the push-button actuator configured to engage the actuator rod when pushed.

In an additional aspect of the present disclosure, the first latch actuator is lockable.

In an additional aspect of the present disclosure, the compartment door includes a steel reinforcement panel.

In an additional aspect of the present disclosure, the reinforcement panel includes a recessed track and a seal sits in the recessed track.

In an additional aspect of the present disclosure, the storage compartment includes a flange and the flange rests on a surface of the first panel.

According to several aspects, a tailgate including a first panel and a second panel connected to the first panel at a first side and a second side opposite to the first side. The tailgate also includes a cavity defined by the first panel and the second panel. The tailgate yet also includes an opening in the first panel, between the first side and the second side of the tailgate, the opening providing access to the cavity. The tailgate further includes a storage compartment, wherein the storage compartment is located within the cavity and defines a storage volume. In addition, the tailgate includes a compartment door connected to the tailgate and movable between a first position and a second position, wherein when in the first position, the storage compartment is covered by the compartment door. The tailgate yet further includes a latching mechanism attached to the first panel within the cavity and outside of the storage compartment, the latching mechanism including a latch, a latch actuator fixed to a first side of the tailgate and an actuator rod connecting the latch to the latch actuator.

In an additional aspect of the present disclosure, the length of the storage compartment is greater than the length of the opening.

In an additional aspect of the present disclosure, the storage compartment includes a flange, wherein the flange wraps over the opening.

In an additional aspect of the present disclosure, an upper trim panel extends from the flange and the upper trim panel is affixed to a surface of the first panel opposing the cavity.

According to several aspects, a pick-up box bed includes a base and at least two side walls extending from the base. The pick-up bed box further includes a tailgate connected to the base, the tailgate moveable between a closed position and an open position. The tailgate includes a first panel and a second panel connected to the first panel at a first side and a second side. The first side and the second side are concealed by the two side walls when the tailgate is in the closed position, and the first side and the second side are exposed when the tailgate is in the open position. The tailgate further includes a cavity defined by the first panel and the second panel and an opening defined by the first panel, between the first side of the tailgate and a second side of the tailgate, the opening providing access to the cavity. The tailgate also includes a storage compartment including a flange. The storage compartment is positioned in the cavity and the flange rests against a surface of the first panel opposing the cavity. The tailgate yet further includes a compartment door connected to the tailgate and movable between an open position and closed position, wherein when in a first position the storage compartment is covered by the compartment door. In addition, the tailgate includes a latching mechanism located within the cavity and outside of the storage compartment. The latching mechanism includes a latch, a latch actuator, and an actuator rod connecting the latch to the latch actuator, wherein the latch engages the compartment door when the compartment door is in the closed position.

In an additional aspect of the present disclosure, the tailgate further includes an upper trim panel extending from the flange.

In an additional aspect of the present disclosure, the upper trim panel is retained by an upper tailgate trim piece.

In an additional aspect of the present disclosure, the tailgate further includes a tailgate lock, wherein the tailgate lock is distal to the pick-up bed box base relative to the latching mechanism.

In an additional aspect of the present disclosure, the compartment door and upper trim panel extend the full width and length of a face of the tailgate between the first side and the second side of the tailgate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure relates to a tailgate storage compartment that is located within a tailgate cavity. The storage compartment includes a latching mechanism that is external to the storage compartment but still within the tailgate cavity. In aspects, the storage compartment latching actuators are concealable when the tailgate is closed and may further be lockable separate from locking of the tailgate. In addition, the storage compartment may include an upper trim panel. The upper trim panel and the compartment door may cover a face of the tailgate, which may assist in reducing the visibility of the storage compartment.

Figure 1:
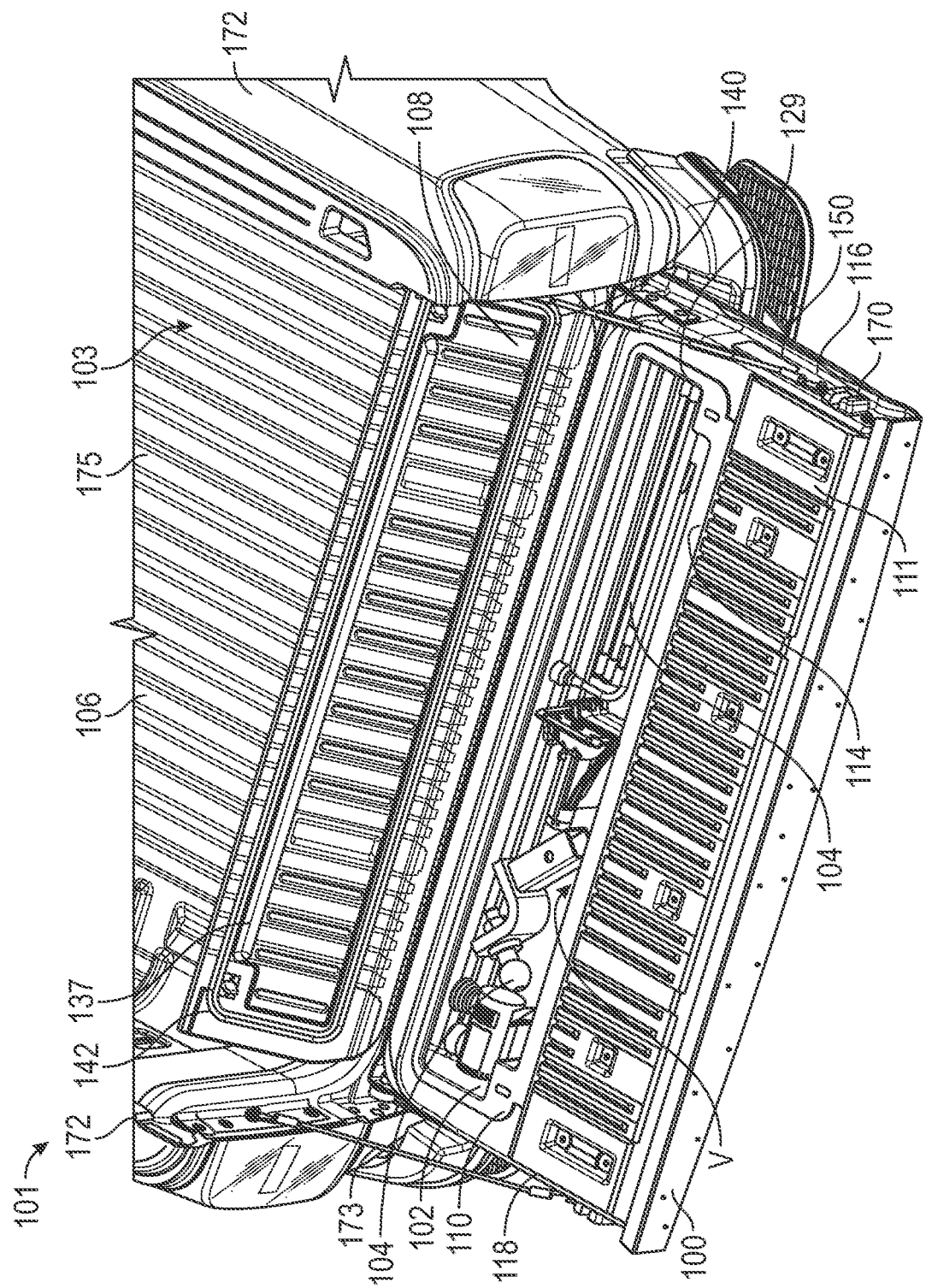
FIG. 1 is an illustration of a perspective view of a tailgate in the open position including a storage compartment with the compartment door in the open position, according to an exemplary embodiment.
Figure 2:
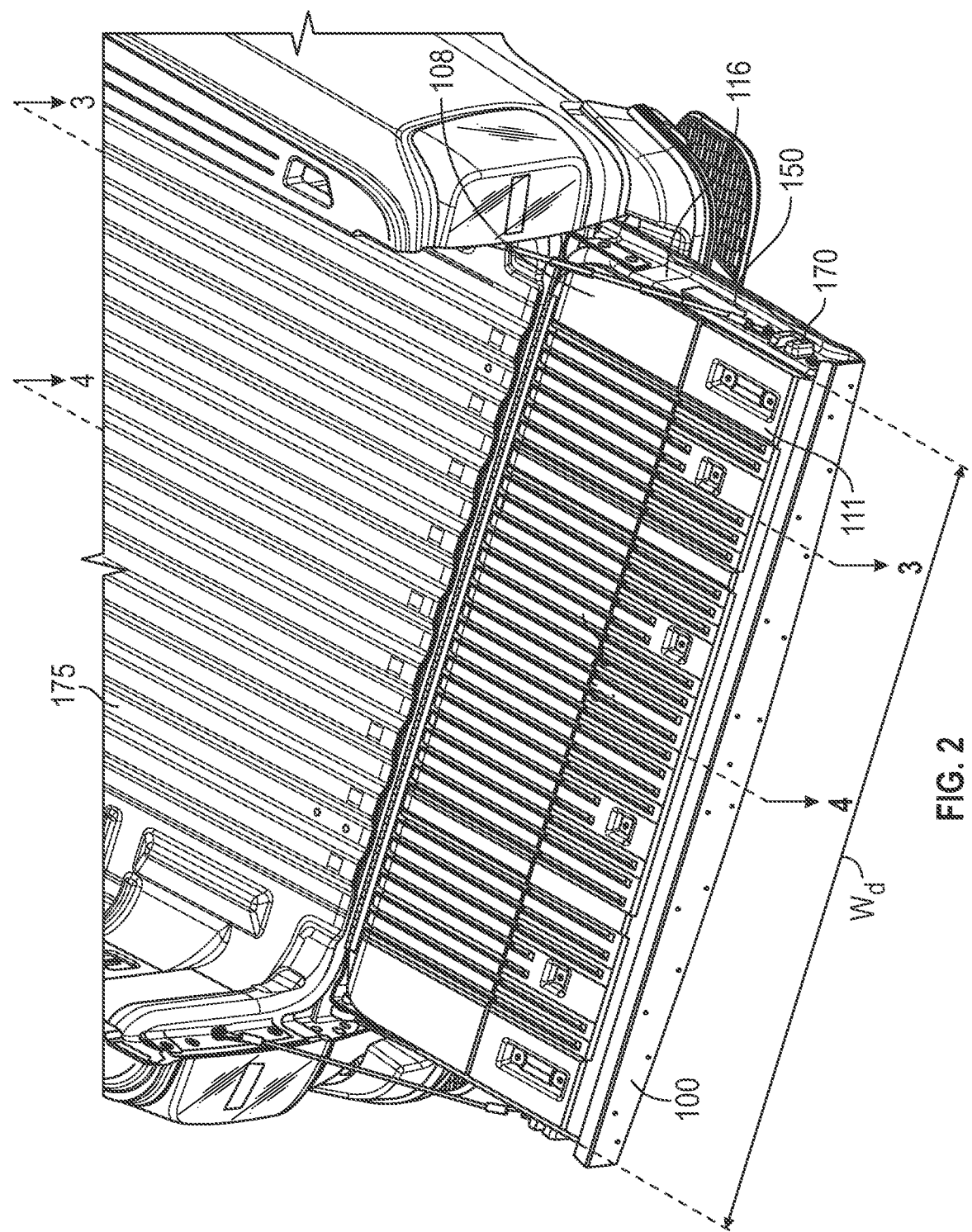
FIG. 2 is an illustration of a perspective view of a tailgate in the open position including a storage compartment with the compartment door in the closed position, according to an exemplary embodiment.

Referring to FIG. 1, the figure illustrates an embodiment of a tailgate 100 having a tailgate storage compartment 102. The tailgate 100 is illustrated with an exemplary pick-up truck 101. The pick-up truck 101 includes a pick-up bed box 103. The tailgate 100 is pivotally connected to the pick-up truck 101 and movable between a first, closed position to close the pick-up bed box 103, to a second, open position to open the pick-up bed box 103. Various items 104 may be stored within the volume V defined by the storage compartment 102. A compartment door 108, which is illustrated as being in an opened position, is pivotally connected to the tailgate 100. The compartment door 108 selectively closes the storage compartment 102 and volume V therein. Further, FIG. depicts the storage compartment 102 including a flange 110 surrounding the periphery of the storage compartment. In this aspect, an upper trim panel 111 extends from the upper edge 114 of the flange 110. It may be appreciated, however, that in other aspects, the upper trim panel 111 may be provided as a separate component from the storage compartment 102, or the upper trim panel 111 may be omitted altogether. FIG. 2 illustrates an aspect of the tailgate storage compartment 102 (not seen) where the compartment door 108 is in the closed position.

The storage compartment 102 may be formed of metal or a polymer material. In the case of a polymer material, the storage compartment may be formed of a thermoplastic or thermoset polymer, such for example, but not limited to, as a thermoplastic olefin (TPO), sheet moulding compound (SMC), polyethylene copolymer, polyurethane, or polyurethane copolymer. In one aspect, the same material may be applied to the bed liner 106, the upper trim panel 111 (if provided separately), or both.

Figure 3:
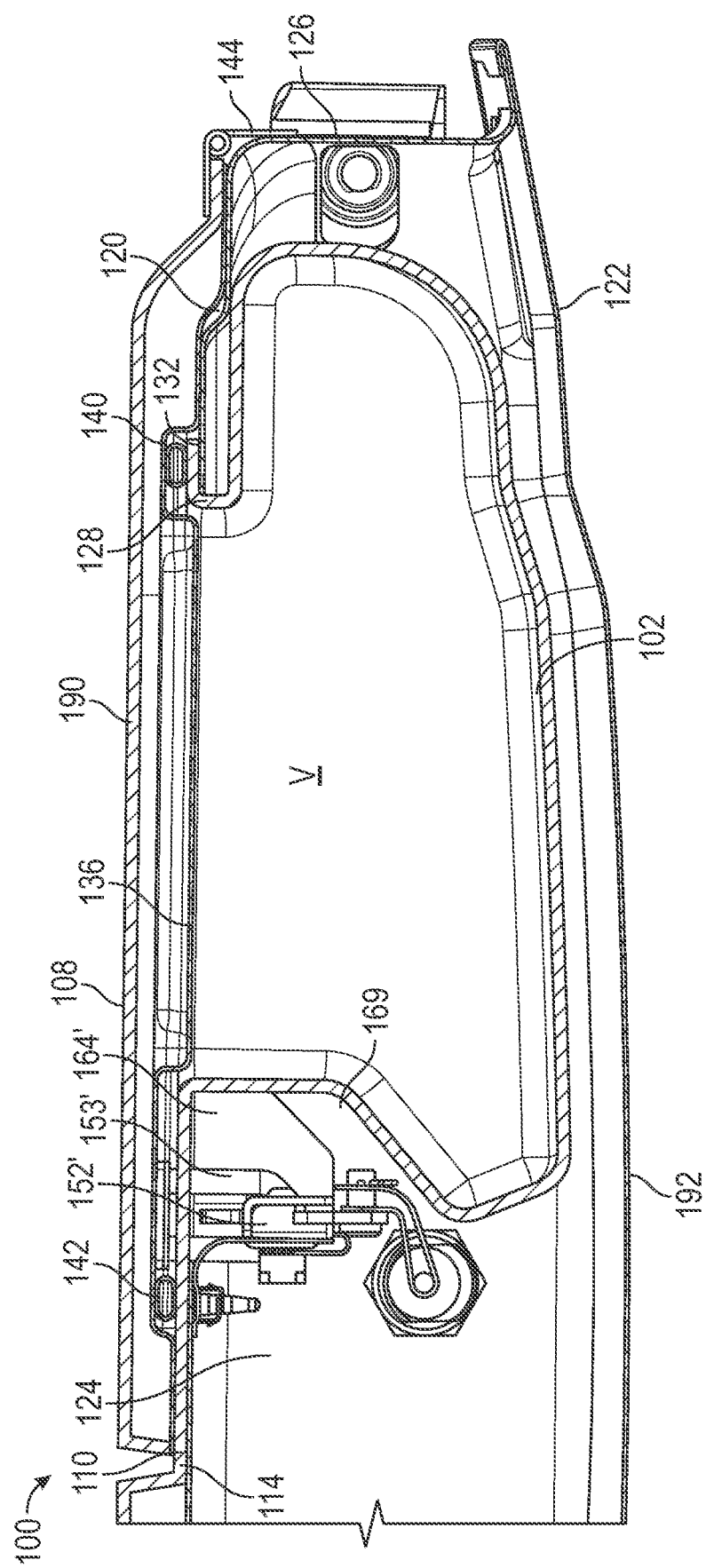
FIG. 3 is an illustration of cross-section 3-3 of FIG. 2, according to an exemplary embodiment.

FIG. 3 illustrates cross-section A-A (see FIG. 2) of an aspect of the tailgate 100. In this aspect, the tailgate 100 includes a first panel 120, a second panel 122, and a cavity 124 defined by the first panel 120 and the second panel 122. The second panel 122 is affixed to the first panel 120 either directly or indirectly; however, in the aspect illustrated, the second panel 122 is directly affixed to the first panel 120, wherein the edges of the second panel 122 are crimped around the first panel 120. Further, in the illustrated aspect, the first panel 120 provides an interior face 190 of the tailgate 100, which faces the pick-up bed box 103. The first panel 120 also provides the sides 116, 118 of the tailgate 100, which are concealed when the tailgate 100 is closed. In alternative aspects, the sides 116, 118 of the tailgate 100 may be provided by additional panels.

The first panel 120 defines an opening 128, which provides access to the cavity 124. The flange 110 is connected to the first panel 120 such that the storage compartment 102 is positioned within the cavity 124 and the flange 110 rests on a surface 132 of the first panel, which opposes the cavity 124. The flange 110 surrounds all, or a portion, of a perimeter 129 of the storage compartment 102. In aspects, the storage compartment 102 is affixed to the first panel 120 by, for example, mechanical fasteners affixed at the flange, or an interference fit between the storage compartment 102 and the opening 128 defined by the first panel 120. In the illustrated aspect, the second panel 122 provides the exterior face 192 of the tailgate 100, which faces away from the pick-up bed box 103.

Figure 4:
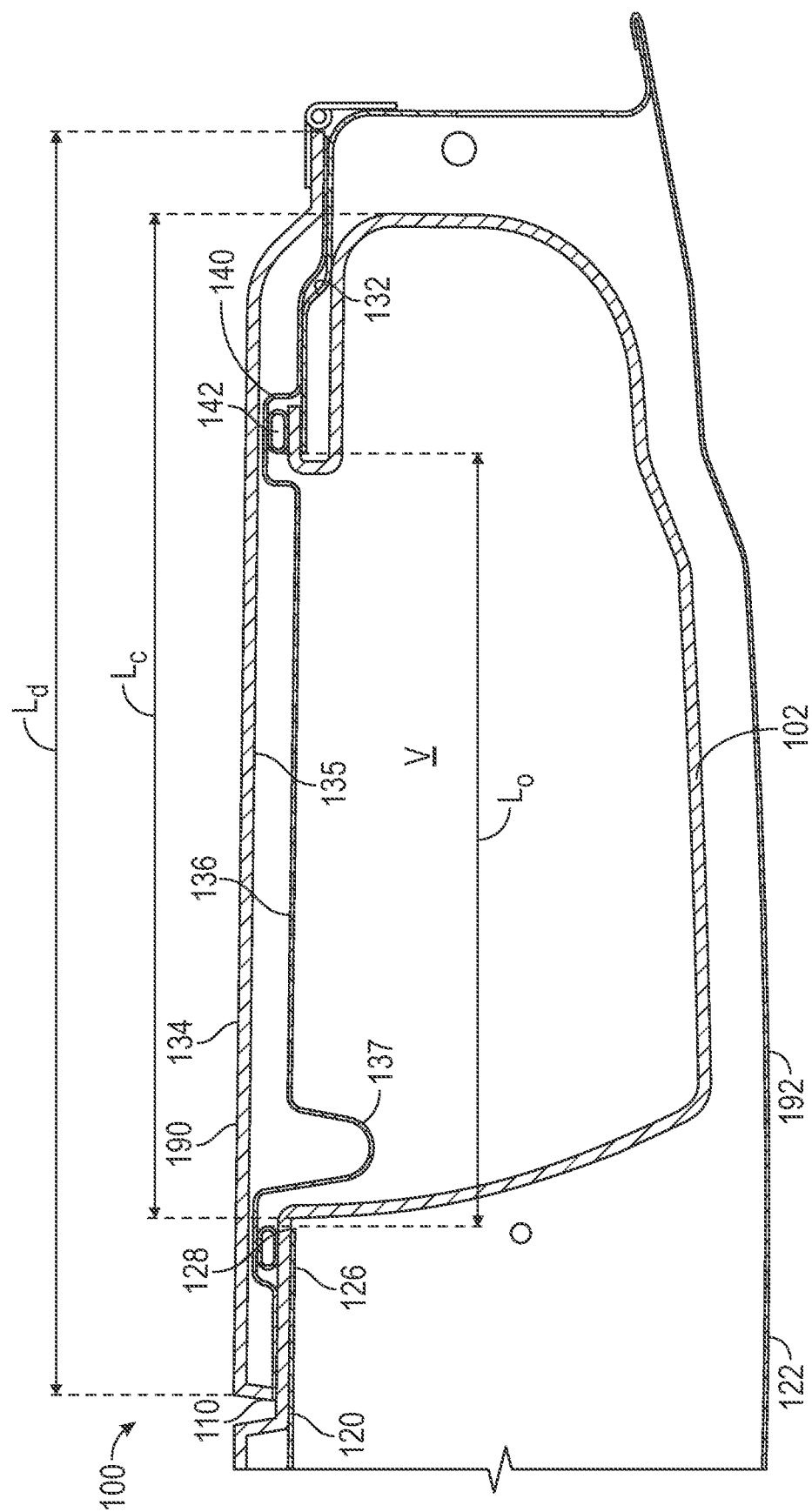
FIG. 4 is an illustration of a cross-section 4-4 of FIG. 2, according to an exemplary embodiment.

Referring to FIG. 4, which is a cross-section B-B (see FIG. 2) of the tailgate 100 taken near the center of the tailgate 100, the figure illustrates an aspect where the storage compartment 102 exhibits a length $L_c$ that is greater than the length $L_o$ of the opening 128. It may be appreciated, however, that in alternative aspects, the length $L_c$ of the storage compartment 102 may be the same as or less than the length $L_o$ of the opening 128. Further, as alluded to above, it should be appreciated that the flange 110 of the storage compartment 102 overlaps the opening 128, resting on the surface 132 of the first panel 120 and may, to some degree, support the storage compartment 102 in the opening 128. In the aspect illustrated in FIGS. 3 and 4, the flange 110, proximal to the base 126 of the tailgate 100, wraps over the opening 128 and rests on the surface 132 of the first panel 120; in effect sandwiching the first panel 120. This portion of the flange 110 may assist in locating the storage compartment 102 in the cavity 124 upon assembly.

FIGS. 3 and 4 also illustrate the compartment door 108, which is connected to the tailgate 100 and movable between a first, closed position and a second, open position. As illustrated in these figures, the compartment door 108 is in the first, closed position. FIGS. 1 and 2 illustrate the compartment door 108 in the second, open position. In the closed position, the compartment door 108 covers the opening 128 and closes the storage compartment 102 as well as the volume V therein. In the aspect illustrated, the compartment door 108 includes a reinforcement panel 136. The reinforcement panel 136 is affixed to the interior surface 135 of the storage compartment door 108, facing the storage compartment 110, and provides structural support for the storage compartment door 108. In embodiments, the reinforcement panel 136 is affixed to the storage compartment door 108 with mechanical fasteners or adhesive. However, in alternative aspects, the reinforcement panel 136 may be omitted.

In aspects, the length of the reinforcement panel 136 may extend the full length $L_d$ of the compartment door 108, or a portion thereof, such as 75 percent or more of the length of the compartment door 108, or 90 percent or more of the length of the compartment door 108. In aspects, the width of the reinforcement panel 136 runs the full width (see $W_d$ of FIG. 1) of the compartment door 108, or a portion thereof, such as 75 percent or more of the width $W_d$ of the compartment door 108, or 90 percent or more of the width $W_d$ of the compartment door.

In addition, in the aspect illustrated, the compartment door 108 includes a recessed track 140 to accommodate one or more seals 142 that sit in the recessed track 140 surrounding the perimeter 129 of the storage compartment 102 or opening 128. The seals 142 may be formed from a polymer material, such as a thermoplastic or thermoset polymer, including but not limited to silicone, synthetic rubber such as ethylene propylene diene monomer, and thermoplastic elastomers. The seals 142 may also be mechanically attached to the recessed track 140 through interlocking features in the track and on the seals 142, by mechanical fasteners, or the seal 142 is affixed to the recessed track 140 using an adhesive.

FIGS. 3 and 4 further illustrate a hinge 144 for moving the compartment door 108 from the first position (as seen in FIGS. 3 and 4) to the second position (illustrated in FIG. 1).

The hinge 144 is illustrated as being affixed to the base 126 of the tailgate; however, in other aspects, the hinge 144 may be affixed elsewhere, such as to the surface 132 of the first panel 120. The hinge 144 may include, but is not limited to, a spring hinge, a barrel hinge, a piano hinge, or multi-bar linkages. One or more hinges 144 may be provided along the entire width $W_d$ of the compartment door 108 (see FIG. 2) or along one or more portions of the width $W_d$, such as at either end of the compartment door 108.

Referring to FIGS. 1 and 4, in an aspect, the reinforcement panel 136 of the compartment door 108 includes a ridge 137, which extends into the volume V in the storage compartment 102. The ridge 137 is illustrated as extending parallel to and distal to the compartment door hinge 144. However, in other aspects, the ridge 137 may assume other configurations.

Figure 5:
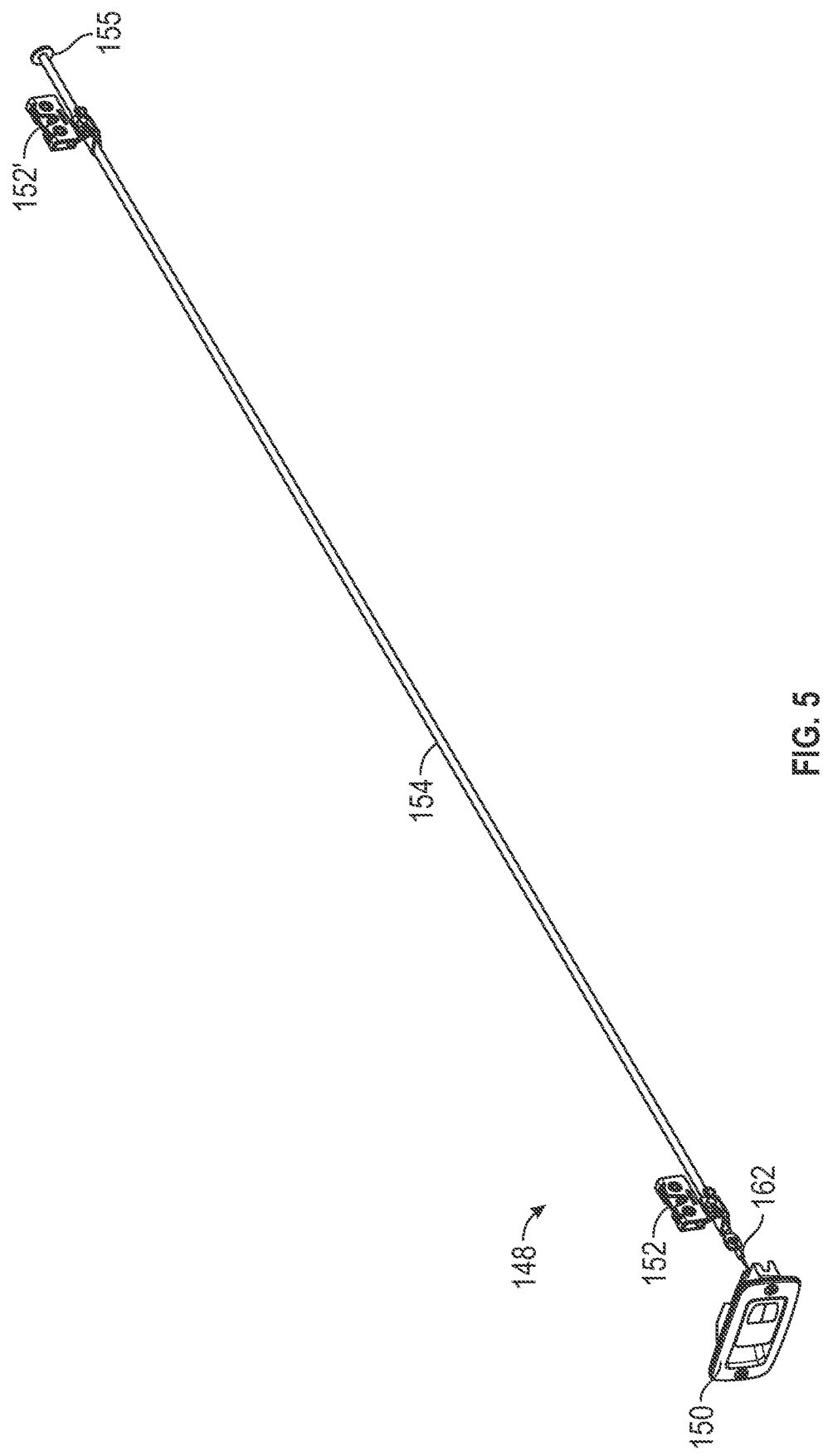
FIG. 5 is an illustration of a latch release assembly, according to an exemplary embodiment.

FIG. 5 illustrates a latching assembly 148 for retaining the compartment door 108 in a first, closed position. The latching assembly 148 includes at least one latch actuator 150, at least one latch 152, and at least one actuator rod 154 connecting the latch actuator to the latch 152. In the illustrated aspect, two latches 152, 152' and one actuator rod 154 are illustrated. However, alternative configurations may be assumed including, for example, more than one actuator rod 154 or more than two latches 152, 152'. In aspects, the actuation of the latch actuators 150, 150' causes the actuator rod 154 to be displaced, moving the latches 152, 152; from a first, closed position to a second, open position.

In an aspect, the actuator rod 154 is coupled to the latch 152 using a latch coupling assembly, which as illustrated (see FIGS. 6 and 7) includes a clip 156, 156' affixed to the actuator rod 154 in a non-sliding manner a pin 158, 158' and a cotter pin 160, 160' holding the pin 158, 158' to the clip 156, 156'. Further, in the illustrated aspect, the actuator rod 154 is coupled to the latch actuator 150, 150' by a flexible coupling wire 162, 162'; however alternative flexible couplings may be employed. In the aspect illustrated, the latch 152, 152' is a rotary latch, normally in a first, closed position; however, other latch configurations may be provided.

Figure 6:
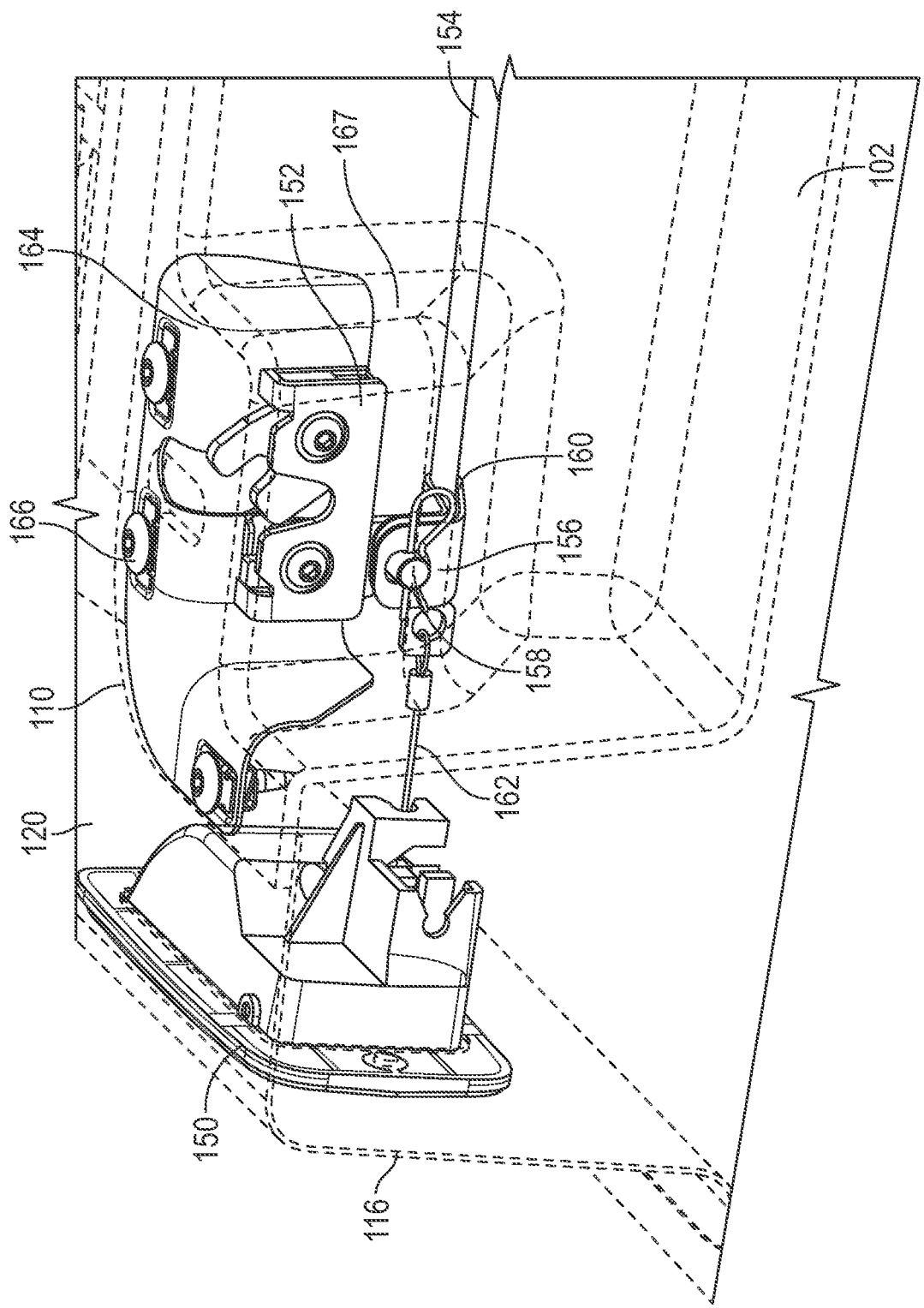
FIG. 6 is an illustration of a latch release assembly including a latch release pull lever as mounted in the tailgate, the storage compartment overlying the latch assembly being illustrated with dashed lines, according to an exemplary embodiment.

FIG. 6 illustrates an aspect employing a pull lever latch actuator 150. The figure also illustrates that the latch 152 is affixed to a latch mounting bracket 164. The mounting bracket 164 is illustrated as being affixed to both the first panel 120 and the flange 110 surrounding the storage compartment 102 and overlying the first panel 120 by three mechanical fasteners 166; however less than three or more than three mechanical fasteners 166, such as up to five mechanical fasteners 166 may be used for each mounting bracket 164. Alternatively, the mounting bracket 164 may be affixed only to the first panel 120 and the flange 110 may be placed over the mechanical fasteners 166, concealing the fasteners 166.

In the illustrated aspect, the latch actuator 150 is affixed to a first side 116 of the tailgate 100. As noted above, the first side 116 of the tailgate 100 is formed from the first panel 120; however, in alternative aspects, the first side 116 of the tailgate 100 may be formed from the second panel 122 or an additional panel. In aspects, a pocket 167 is formed by the storage compartment 102 to accommodate the latch 152 and shield the latch 152 from the volume V in the storage compartment 102. The pocket 167 is illustrated as being formed in the corner of the storage compartment 102; however, in alternative aspects, it may be formed in alternative locations.

Figure 7:
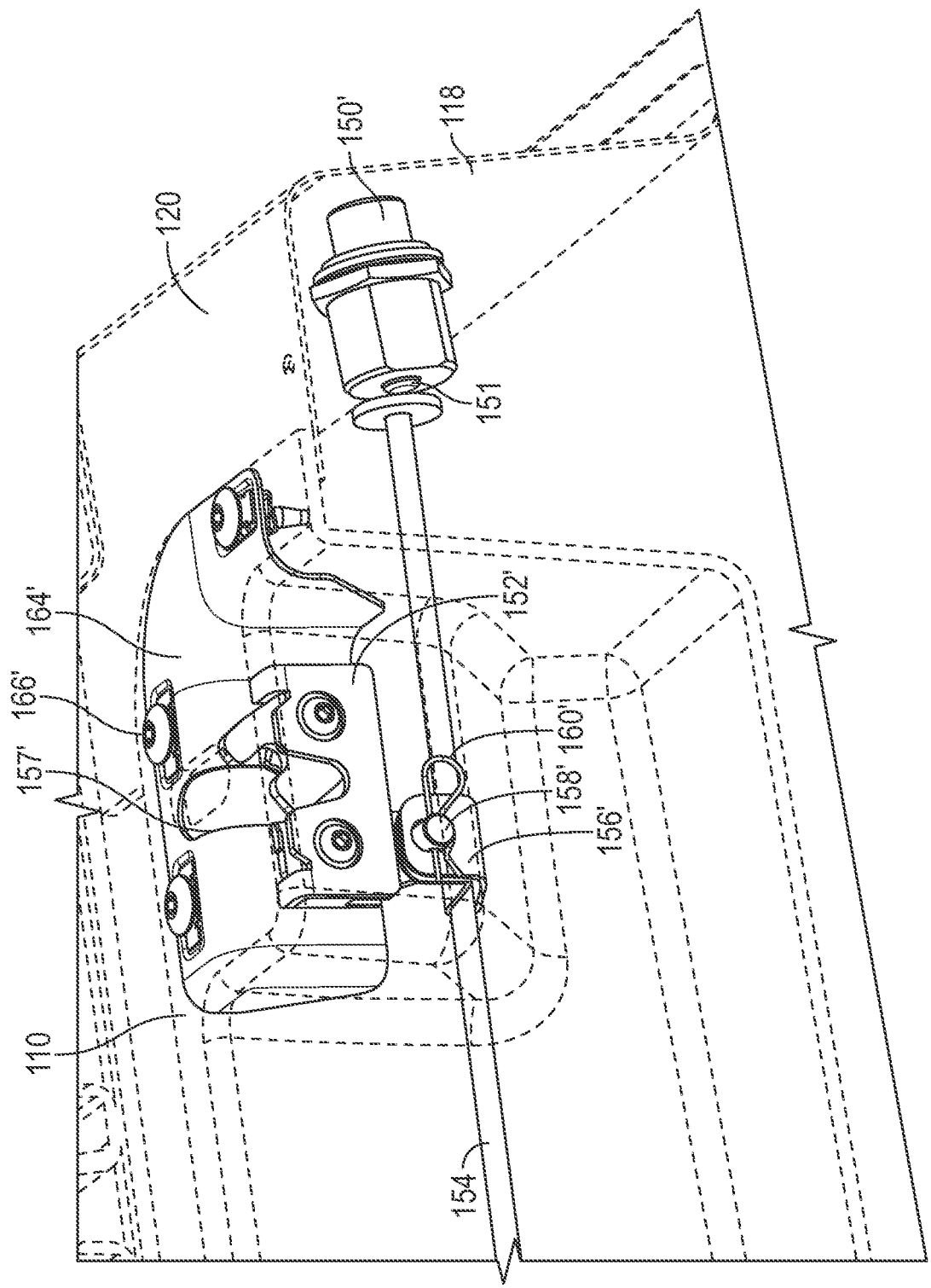
FIG. 7 is an illustration of a latch release assembly including a push-button latch actuator as mounted in the tailgate, the storage compartment overlying the latch assembly and the latch release push button being illustrated with dashed lines, according to an exemplary embodiment.

Other latch actuators 150 may be employed in addition to, or alternatively to, the pull lever latch actuator illustrated in FIGS. 5 and 6. For example, as illustrated in FIG. 7, a push-button latch actuator 150' is provided in addition to the pull lever latch actuator 150 (seen in FIGS. 5 and 6) proximal to the actuator rod stop 155. In this aspect, the push-button latch actuator 150' is affixed to the other, second side 118 of the tailgate 100 opposing the first side 116 (see FIGS. 1, 6). Again, in alternative embodiments, the push-button latch actuator 150' may be used alone, i.e., without the pull lever latch actuator.

The latch 152' is again affixed to a latch mounting bracket 164' (also illustrated in FIG. 3). The mounting bracket 164' is also illustrated as being affixed to both the first panel 120 and the flange 110 by three mechanical fasteners 166'. Again, however, less than three or more than three mechanical fasteners 166', such as up to five mechanical fasteners 166' maybe used for each mounting bracket 164'. Alternatively, the mounting bracket 164' is affixed to only the first panel 120. The flange 110 may be placed over the mechanical fasteners 166', concealing the mechanical fasteners 166'. A second pocket 169 for accommodating the second latch 152' is defined by the storage compartment 102, shielding the latch 152' from the volume V of the storage compartment 102. The second pocket 169 is illustrated as being formed in the corner of the storage compartment 102; however, in alternative aspects, it may be formed in alternative locations.

In the illustrated aspect, the push button latch actuator 150' locks the actuator rod 154 in place with a linearly adjustable pin 151, wherein the pin is extendable and retractable. The pin 151 is illustrated in the unlocked position, where it is retracted. In the locked position, the pin 151 is extended towards the actuator rod 154 and contacts a stop 155 on the actuator rod 154, preventing the actuator rod 154 from being displaced by the first latch actuator (150 in FIG. 6) and activating the latch 152. However, in another, non-illustrated aspect, the push-button actuator 150' may be tied to the actuator rod 154 such that its linear travel is imparted to the actuator rod 154 by the push-button actuator 150'. In such an aspect, the push-button actuator 150' may be used without the pull lever actuator 150 illustrated in FIG. 6. In further aspects the latch actuators 150, 150' may be locking. When two latch actuators 150, 150' are present, each latch actuator 150, 150' may be positioned at either side 116, 118 of the tailgate 100 or both at one side 116, 118 of the tailgate 100.

FIG. 3 illustrates an aspect of a striker 153'. The striker 153' is affixed to the compartment door 108 and, in this aspect, to the reinforcement panel 136. With reference to FIG. 7, in one aspect, the striker 153' (not illustrated) passes through an opening 157' in the flange 110 as well as through the opening 128 in the first panel 120. Referring again to FIG. 3, the striker 153' is illustrated as being "U" shaped, but it may be appreciated that the striker 153' may exhibit other configurations depending on the type of latch 152' used. When the latch 152' is in a first, closed position and the compartment door 108 is in a closed position, the latch 152' engages the striker 153' and retains the compartment door 108 in a closed position.

Figure 8:
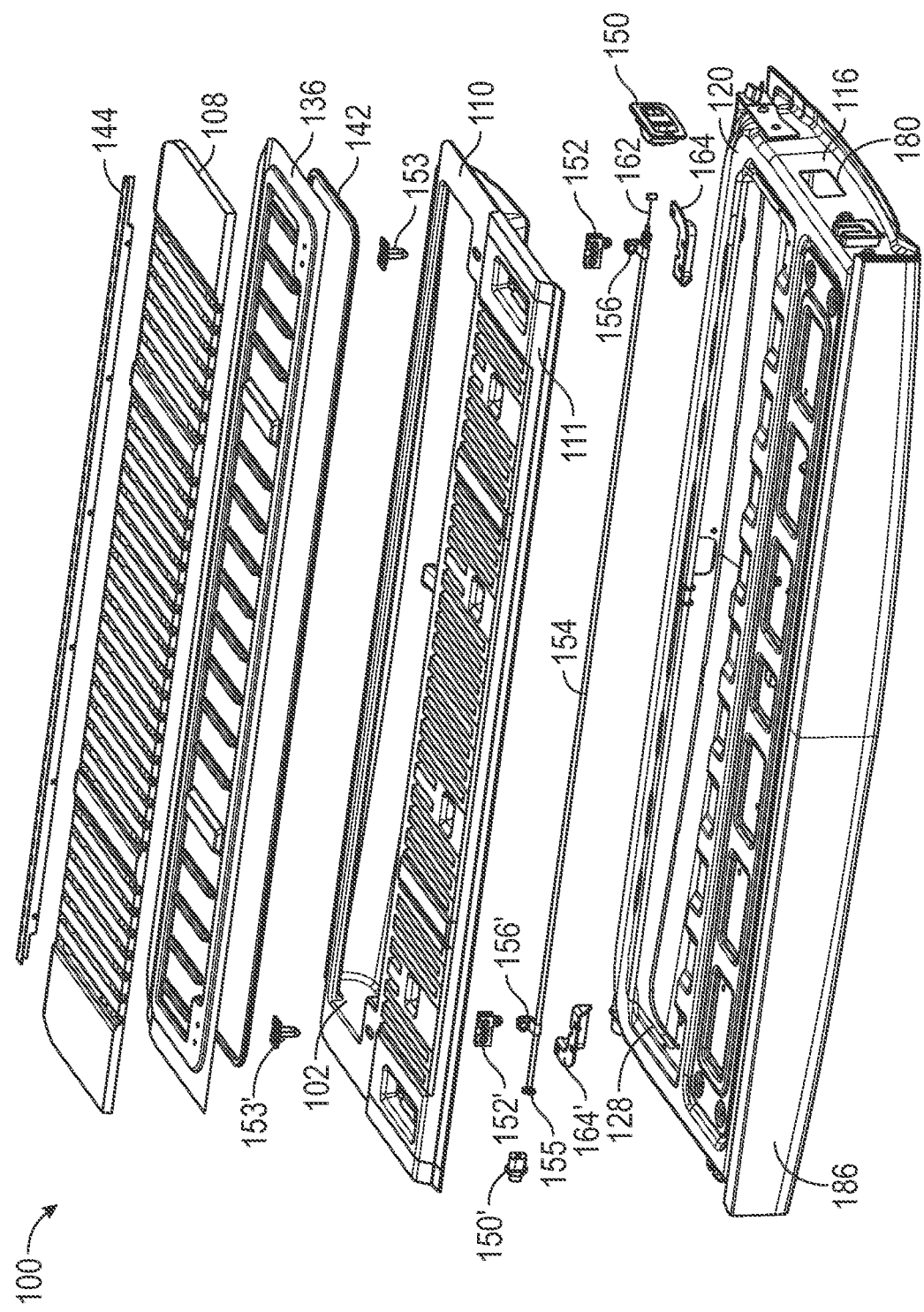
FIG. 8 is an exploded view of an aspect of the tailgate according to an exemplary embodiment.

FIG. 8 provides an exploded view of the tailgate 100 according to multiple aspects of the disclosure further illustrating the assembly of the tailgate 100 and latching mechanisms. As illustrated and noted above, the tailgate 100 includes an opening 128 defined in the first panel 120 of the tailgate. Also defined in the side 116 of the tailgate 100 is an opening 180 for the pull-lever latch actuator 150. Not illustrated is a hole in the opposing side of the tailgate 100 for a push-button actuator 150'. As noted above, only a single latch actuator 150, 150' may be utilized and the single latch actuator may be either a pull-lever actuator or a push-button actuator.

The latch mounting brackets 164, 164' are mounted in the cavity 124 (see FIG. 3) at the corners of the opening 128 proximal to the top 186 of the tailgate 100. The latches 152, 152' are affixed to the mounting brackets 164, 164' within the cavity 124 and the latch actuator rod 154 is attached to the latches 152, 152' by clips 156, 156'. The latch actuators 150, 150' are affixed to or interact with the ends of the latch actuator rod 154 as described above. For example, in the case of the pull-lever latch actuator 150, the pull-lever latch actuator 150 is affixed to latch actuator rod 154 via assembly by a flexible coupling wire 162.

Over the cavity opening 128 and latch mechanism is positioned the tailgate storage compartment 102 and the trim panel 111, which as illustrated extends from the tailgate storage compartment 102. The tailgate storage compartment 102 sits within the cavity 124, as illustrated in FIG. 3. A flange 110 extends around the tailgate storage compartment 102 and rests on top of the first panel 120 of the tailgate 100. The trim panel 111 overlies the portion of the tailgate 100 above the opening 128 proximal to the top 186 of the tailgate 100.

The compartment door 108 sits on the first panel 120, closing the tailgate storage compartment 102. As illustrated, a reinforcing panel 136 is affixed to the compartment door 108 and sits between the flange 110 and the compartment door 108, also covering the tailgate storage compartment 102. From the compartment door 108 and reinforcing panel 136 extend strikers 153, 153' extended from each end of the compartment door 108. Again, the strikers 153, 153' being positioned to be captured by the latches 152, 152' as illustrated in FIG. 3. The compartment door 108 is illustrated as being affixed to the tailgate 100 by the hinge 144 as illustrated in FIG. 3.

Reference is now made again to FIG. 1, which illustrates the tailgate 100 connected to the pick-up truck 101. As illustrated, a pull lever latch actuator 150 affixed to one side 116 of the tailgate 100 and proximal to the pick-up box bed 103 relative to the tailgate lock 170 positioned distal from the pick-up box bed 103. It may be appreciated that the tailgate lock 170 may retain the tailgate 100 in a closed position and require a key to release the tailgate 100. In non-limiting aspects the tailgate lock 170 may be mechanical or electromechanical. It may also be appreciated that the tailgate 100 is connected to the pick-up box bed 103 base 175 by one or more hinges 173, including but not limited to those noted above, and when the tailgate 100 is closed, the latch actuators 150, 150' are concealed by the side walls 172 extending up from the pick-up bed box base 175. It may further be appreciated that locking actuators 150, 150' are not necessary to provide a secure storage location and the actuators 150, 150' may not be lockable, as the tailgate 100 may be closed and locked, barring access to the latch actuators 150, 150'.

Figure 9:
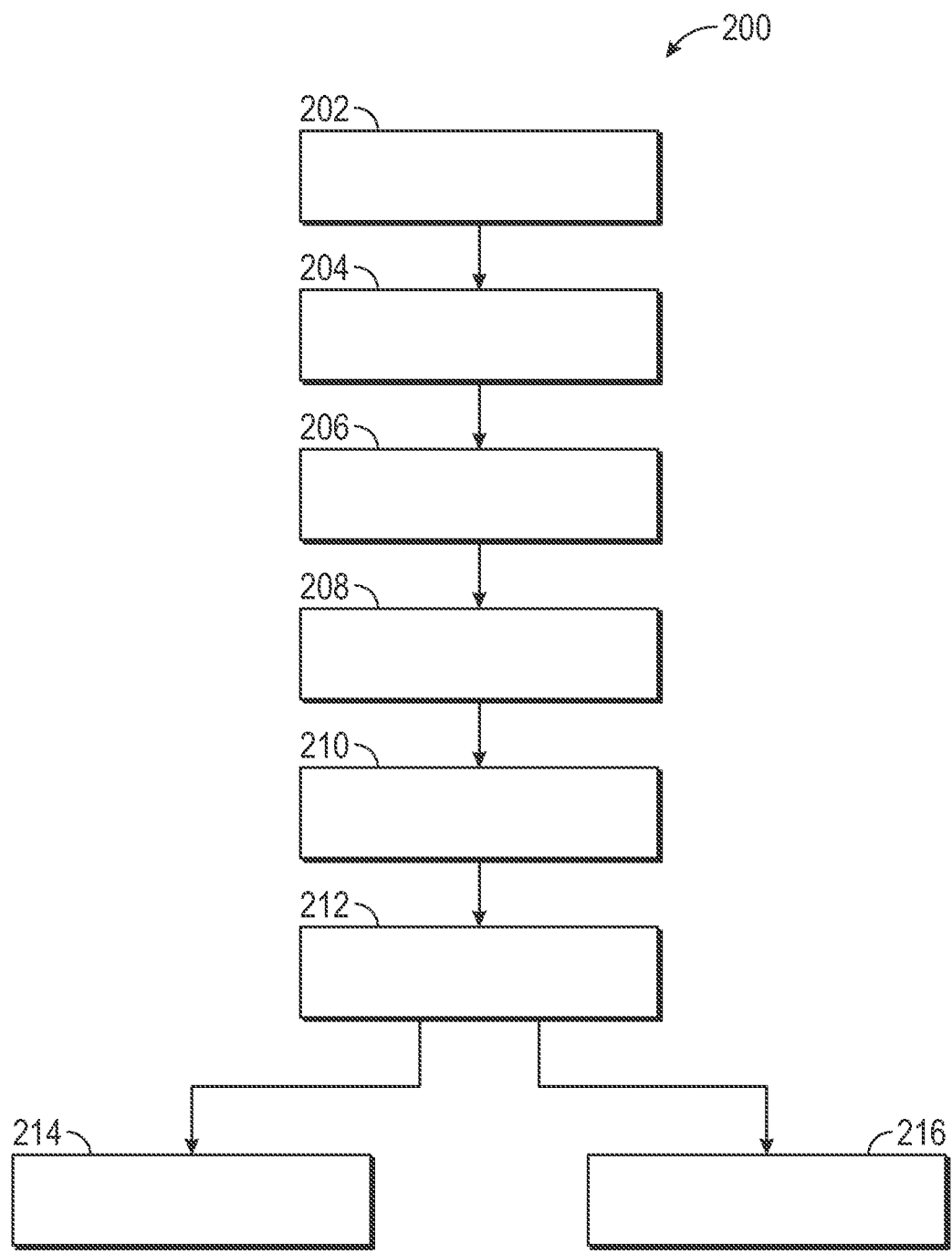
FIG. 9 is flow diagram of a method of providing a storage compartment in a tailgate according to an exemplary embodiment.
Figure 10:
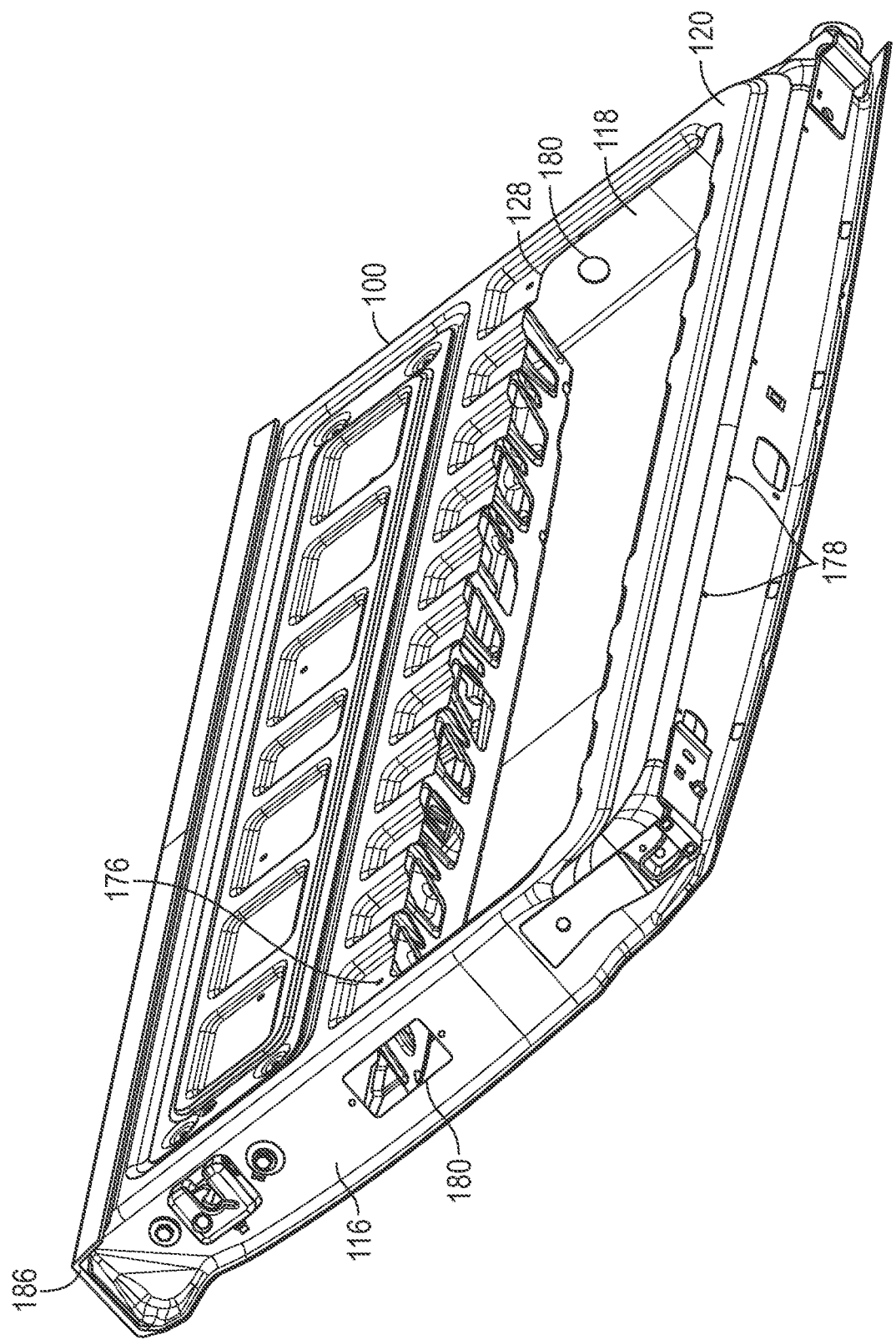
FIG. 10 is a perspective view of a tailgate without the storage compartment illustrating assembly holes and openings according to an exemplary embodiment.

In an aspect of a method 200 of assembling the storage compartment is illustrated in the flow chart of FIG. 9. An opening may be formed in a first panel of the tailgate 202 prior to assembling the first and second panels into the tailgate or after assembling the first and second panels into the tailgate. Prior to assembly, the opening may be formed through stamping or a trimming process. Post assembly, the opening may be formed through a trimming process. Trimming processes may include, but are not limited to milling, laser cutting, plasma cutting, or sawing. FIG. 10 illustrates the opening 128 provided in the first panel 120 of the tailgate 100 between the sides of the tailgate prior to the addition of the storage compartment 102.

Referring back to FIG. 9, holes are drilled in the first panel 204 to accommodate the mechanical fasteners for the latch mounting bracket and the compartment door hinge and an opening is provided for the latching actuator, if not already provided when the tailgate is formed. FIG. 10 illustrates holes 176 for the mechanical fasteners, holes for the hinges 178, and openings for latching actuators 180.

Referring again to FIG. 9, an anti-corrosion liquid is then applied to the holes and openings formed in the tailgate 206. The latch mounting brackets are then attached to the first panel 208 and the latch assembly is then loaded into the tailgate and assembled 210. The storage compartment is then inserted into the cavity through the first panel 212. The storage compartment and upper trim panel are then affixed in place 214.

Figure 11:
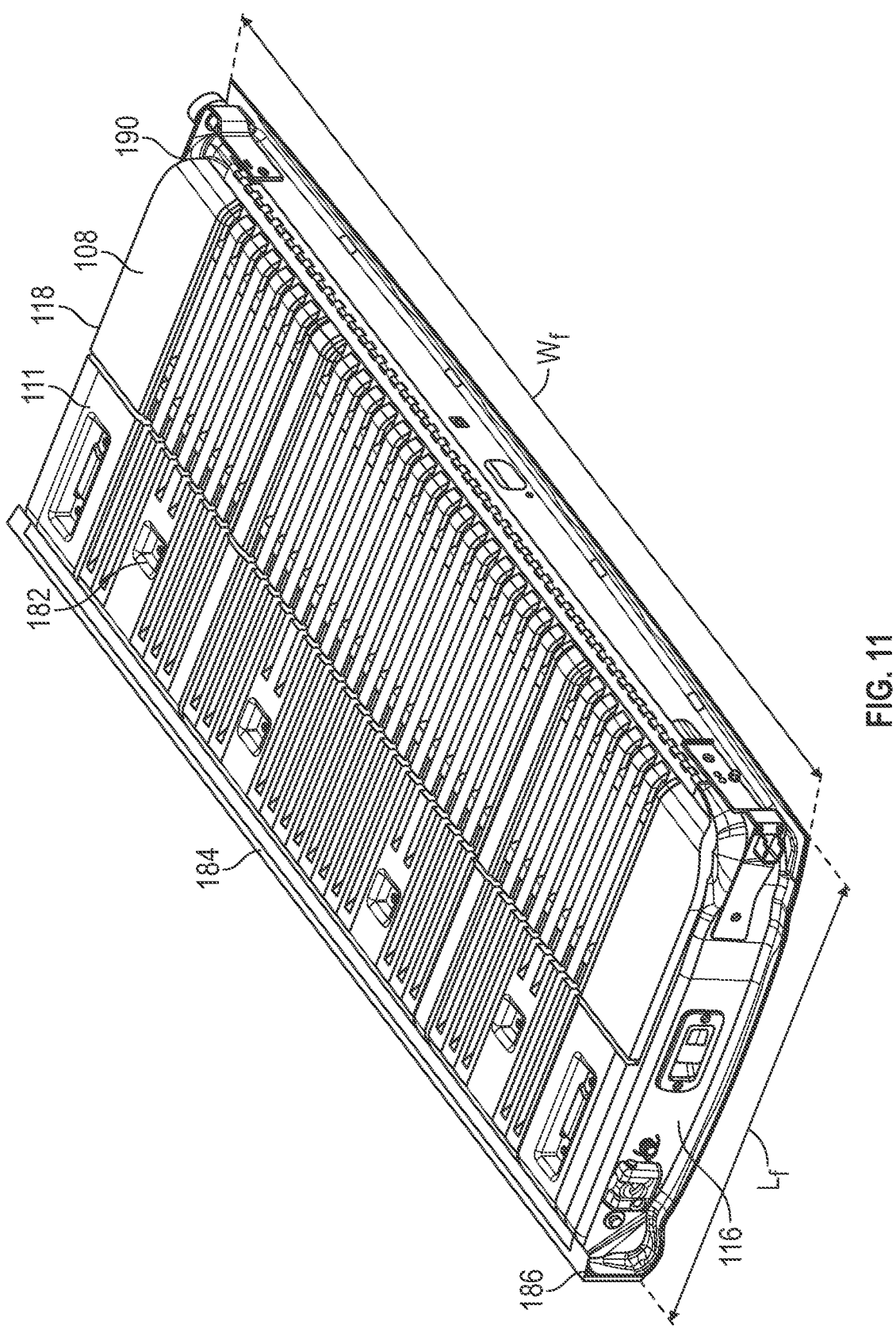
FIG. 11 is a perspective view of a tailgate including a storage compartment including a flange and a compartment door according to an exemplary embodiment.

For example, as illustrated in FIG. 11, in an aspect, a number of mechanical fasteners 182 are used to retain the upper trim panel 111 in place along with the upper tailgate trim piece 184 which is positioned over the top 186 of the tailgate 100 and the distal end of the upper trim panel 111.

Referring again to FIG. 9, the compartment door is also assembled 216. The compartment door may be assembled at the same time as, before, or after affixing the upper trim panel and is shown as a parallel process.

As may be appreciated, and as illustrated in the aspect of FIG. 11, the upper trim panel 111, upper tailgate trim piece 184, and compartment door 108 may extend along the entire length $L_f$ and width $W_f$ of the face 190 of the tailgate visible when the tailgate is in the closed position. However, it may be appreciated that in other aspects less than the entire face 190 of the tailgate is covered by the compartment door and upper trim panel, wherein greater than 90 percent or more of the tailgate face is covered or 75 percent or more of the tailgate face is covered.

The storage compartment 102 is described herein as being located in a pick-up box bed tailgate 100, wherein the tailgate 100 is attached at its base 126 to the pick-up box bed 103. However, the present disclosure is applicable to other tailgates as well, including those tailgates 100 that are attached and pivot from a side wall 172 rather than from the base 126 of the tailgate 100.

A tailgate storage compartment 102 of the present disclosure offers several advantages. These advantages include, for example, a relatively convenient and secure tailgate storage compartment for various items, such as tools or vehicle accessories. These advantages further include, for example, that the location of the storage compartment within the tailgate does not reduce the storage volume within the pick-up bed. Further, these advantages yet further include, for example, an improvement in concealing the storage compartment when a full width compartment door and upper trim panel are present. These advantages yet further include, for example, protecting the latch mechanism from being jammed by items stored in the storage compartment. These advantages yet further include, for example, protecting the latch actuator from damage by placing the latch actuator on the side of the tailgate, away from a loadable surface. These advantages yet further include, for example, concealing the latch actuator in placing the latch actuator at a side of the tailgate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A tailgate, comprising:
   a first panel;
   a second panel connected to the first panel at a first side and a second side opposing the first side;
   a cavity defined by the first panel and the second panel;
   an opening defined by the first panel between the first side and the second side, the opening providing access to the cavity;
   a storage compartment, wherein the storage compartment is positioned in the cavity;
   a latching mechanism located within the cavity and outside of the storage compartment, the latching mechanism including a latch, an actuator rod, and a first latch actuator, wherein the actuator rod connects the latch and the latch actuator;
   the first latch actuator is affixed to a first side of the tailgate; and
   a compartment door connected to the tailgate and moveable between a first position and a second position, wherein when in the first position the storage compartment is covered by the compartment door, the compartment door including a striker, wherein the striker is engage-able by the latch.

2. The tailgate of claim 1, further comprising a pocket defined by the storage compartment, wherein the latch is at least partially located in the pocket.

3. The tailgate of claim 1, wherein the first side and the second side are formed from the first panel.

4. The tailgate of claim 1, further comprising a latch mounting bracket, wherein the latch mounting bracket is affixed to the first panel.

5. The tailgate of claim 4, wherein the latch is affixed to the latch mounting bracket.

6. The tailgate of claim 1, wherein the first latch actuator includes a pull lever latch actuator or a push-button actuator.

7. The tailgate of claim 6, wherein the push-button actuator is configured to engage the actuator rod when a second latch actuator is pushed.

8. The tailgate of claim 1, wherein the first latch actuator is lockable.

9. The tailgate of claim 1, wherein the compartment door includes a steel reinforcement panel.

10. The tailgate of claim 9, wherein the reinforcement panel includes a recessed track and a seal sits in the recessed track.

11. The tailgate of claim 1, wherein the storage compartment includes a flange and the flange rests on a surface of the first panel.

12. A tailgate, comprising:
    a first panel;
    a second panel connected to the first panel at a first side and a second side opposite to the first side;
    a cavity defined by the first panel and the second panel;
    an opening defined by the first panel between a first side of the tailgate and a second side of the tailgate, the opening providing access to the cavity;
    a storage compartment, wherein the storage compartment is located within the cavity and defines a storage volume;
    a compartment door connected to the tailgate and movable between a first position and a second position, wherein when in the first position the storage compartment is covered by the compartment door; and a latching mechanism attached to the first panel within the cavity and outside of the storage compartment, the latching mechanism including a latch, a latch actuator fixed to the first side of the tailgate and an actuator rod connecting the latch to the latch actuator.

13. The tailgate of claim 12, wherein a length of the storage compartment is greater than a length of the opening.

14. The tailgate of claim 12, wherein the storage compartment includes a flange, wherein the flange wraps over the opening.

15. The tailgate of claim 12, further including an upper trim panel extending from a flange, wherein the upper trim panel is affixed to a surface of the first panel opposing the cavity.

16. A pick-up bed box, comprising:
a base and at least two side walls extending from the base;
a tailgate connected to the base, the tailgate movable between a closed position and an open position, the tailgate comprising:
a first panel connected to a second panel at a first side and a second side, wherein the first side and the second side are concealed by the two side walls when the tailgate is in the closed position, and the first side and the second side are exposed when the tailgate is in the open position;
a cavity defined by the first panel and the second panel;
an opening defined by the first panel between a first side of the tailgate and a second side of the tailgate, the opening providing access to the cavity;
a storage compartment including a flange, wherein the storage compartment is positioned in the cavity and the flange rests against a surface of the first panel opposing the cavity;
a compartment door connected to the tailgate and movable between an open position and a closed position, wherein when in the first position the storage compartment is covered by the compartment door;
a latching mechanism located within the cavity and outside of the storage compartment, the latching mechanism including a latch, a latch actuator, and an actuator rod connecting the latch to the latch actuator;
wherein the latch engages the compartment door when the compartment door is in the closed position.

17. The pick-up bed box of claim 16, the tailgate further including an upper trim panel extending from the flange.

18. The pick-up bed box of claim 17, wherein the upper trim panel is retained by an upper tailgate trim piece.

19. The pick-up bed box of claim 16, wherein the tailgate further includes a tailgate lock, wherein the tailgate lock is distal to the pick-up bed box base relative to the latching mechanism.

20. The pick-up bed box of claim 17, wherein the compartment door and upper trim panel extend a full width and length of a face of the tailgate between the first side and the second side.

* * * * *